US005989382A

United States Patent [19]
Parker

[11] Patent Number: 5,989,382

[45] Date of Patent: Nov. 23, 1999

[54] UTILIZING IDENTICAL STAGGERED PATTERN FORMS THROUGH FAX OR PRINTER VIA OFFSETTING

[75] Inventor: Rebecca L. Parker, Grand Island, N.Y.

[73] Assignee: Moore U.S.A., Inc., Grand Island, N.Y.

[21] Appl. No.: 08/902,314

[22] Filed: Jul. 29, 1997

[51] Int. Cl.[6] ........................ B32B 31/00; B65D 27/34

[52] U.S. Cl. ........................ 156/292; 156/291; 156/297; 156/277; 229/313; 229/316; 229/82; 229/92; 271/303; 283/98; 283/101; 283/105

[58] Field of Search ........................ 156/297, 291, 156/277, 387, 292; 229/313, 316, 92, 82; 271/303, 207, 213; 283/94, 98, 101, 103, 105, 116

[56] References Cited

U.S. PATENT DOCUMENTS

| | | | |
|---|---|---|---|
| 2,123,903 | 7/1938 | Lane et al. . | |
| 3,088,754 | 5/1963 | Burgmer . | |
| 3,916,051 | 10/1975 | Wakeman . | |
| 3,975,590 | 8/1976 | Nelson . | |
| 4,335,949 | 6/1982 | Kukucka et al. | 355/5 |
| 4,575,121 | 3/1986 | Conti . | |
| 4,824,142 | 4/1989 | Dossche . | |
| 4,896,823 | 1/1990 | Taylor . | |
| 5,085,469 | 2/1992 | Castro | 283/94 |
| 5,167,739 | 12/1992 | Hutchinson et al. | 156/64 |
| 5,174,491 | 12/1992 | Taylor et al. . | |
| 5,174,493 | 12/1992 | File . | |
| 5,201,464 | 4/1993 | File . | |
| 5,238,178 | 8/1993 | Hutchinson et al. . | |
| 5,294,041 | 3/1994 | Whiteside . | |
| 5,314,110 | 5/1994 | Lombardo . | |
| 5,318,324 | 6/1994 | Lombardo et al. . | |
| 5,334,571 | 8/1994 | Baxter | 503/226 |
| 5,346,123 | 9/1994 | Lombardo . | |
| 5,350,199 | 9/1994 | Young et al. . | |
| 5,366,145 | 11/1994 | Sauerwine . | |
| 5,376,048 | 12/1994 | Whiteside . | |
| 5,409,752 | 4/1995 | Juteau . | |
| 5,419,590 | 5/1995 | Rothschild . | |
| 5,437,476 | 8/1995 | Hutchinson . | |
| 5,458,273 | 10/1995 | Schubert et al. . | |
| 5,472,240 | 12/1995 | Davies . | |
| 5,553,774 | 9/1996 | Goodno . | |
| 5,566,528 | 10/1996 | Lee . | |

*Primary Examiner*—Jeff H. Aftergut
*Assistant Examiner*—Robert Hendrix
*Attorney, Agent, or Firm*—Nixon & Vanderhye P.C.

[57] ABSTRACT

Specialized sheets, for example, in the construction of business forms, having patterns of pressure activated cohesive are constructed so that all the sheets can be identical yet when the sheets are in a stack blocking of the pressure activated cohesive, and subsequent feeding problems, are eliminated by making the cohesive patterns offset a dimension "d" perpendicular to the direction of feed of the forms from a feed bin through an imaging device to an output tray. Either the feed bin, or an edge guide of the output tray, can be shifted at least the dimension "d" to automatically align the pressure activated cohesive patterns on cooperating first and second sheets, and after proper alignment of the cohesive patterns the sheets may be fed through a conventional pressure sealer. An inserter may be provided for inserting a confidential information sheet between the cohesive pattern-containing sheets, and/or confidential information may be imaged on the inside faces of the sealed packet formed by the sheets using a non-impact printer or facsimile machine.

21 Claims, 4 Drawing Sheets

UTILIZING IDENTICAL STAGGERED PATTERN FORMS THROUGH FAX OR PRINTER VIA OFFSETTING

BACKGROUND AND SUMMARY OF THE INVENTION

In the construction of sealed packets or form sets having confidential information within the sealed package or form set, common practice is to feed the sheets from a stack in a feed bin through an imaging device (such as a printer or facsimile machine) to an output tray, and either with or without inserting a third sheet, sealing the pressure sensitive cohesive patterns on the sheets together. Of course in order to provide sealing the pressure sensitive cohesive patterns must be aligned when sealing occurs, however when the pressure activated cohesive patterns are in engagement with each other in the feed bin blocking can occur, making the feeding of forms very difficult. This can be solved by providing sheets that do not have cohesive patterns in contact with each other in the feed bin by making the sheets non-identical, or by requiring inversion of alternate sheets in order to bring one into contact with the other, but these procedures introduce additional complications into the processing and therefore are also undesirable. The basic features of the prior art system are disclosed in co-pending application Ser. No. 08/749,697, filed Nov. 15, 1996 (attorney dkt. 263-1535; 96-46 US), the disclosure of which is hereby incorporated by reference herein.

According to the present invention the problems with the prior art construction which are set forth above are solved. According to the invention it is possible to allow each of the sheets in the feed bin to be identical, yet prevent contact of cohesive from one sheet to the other and thereby prevent blocking and its associated problems. Each sheet of the confidential packet or form set of the invention is the same and has arrangements of pressure activated cohesive on the front and back that are staggered from each other so that the facing cohesive patterns on adjacent form sheets are non-aligned when in a stack in a feed bin (input tray). All of the patterns that are to be aligned have a dimension "d" that is relevant to their ultimate alignment, and the sheets—after passing through the imaging device—are shifted a distance of at least "d" in a dimension typically parallel to the top and bottom edges of the sheet, and typically transverse to the direction of feed through the imaging device, so that the cooperating cohesive patterns are aligned. The form sets may then be readily passed through a conventional pressure sealer such as available from Moore U.S.A. of Lake Forest, Ill. under the trademark SPEEDISEALER® in order to get the desired product.

According to a first aspect of the present invention a specialized sheet is provided, comprising: A substantially quadrate sheet of paper having first and second faces, top and bottom edges substantially parallel to each other, and first and second side edges substantially parallel to each other and substantially perpendicular to said top and bottom edges. A first series of patterns of pressure activated cohesive disposed on the first face, including adjacent the first and second side edges and having a substantially uniform dimension "d" parallel to the top and bottom edges. And, a second series of patterns of pressure activated cohesive disposed on the second face which are substantially identical to the first series of patterns, and having the centerline thereof spaced from the first series of patterns at least the substantially uniform dimension "d" parallel to the top and bottom edges.

The first and second series of patterns preferably also include patterns disposed adjacent the top and bottom edges, also having the dimension "d", and having the centerlines thereof spaced from each other at least the uniform dimension "d" parallel to the top and bottom edges. Lines of weakness may be disposed in the sheet substantially parallel to the side edges, including lines of weakness between the first and second series of patterns adjacent each side edge, and—if desired to facilitate opening of a sealed packet produced from a pair of specialized sheets—on the opposite side of the pattern furthest from each side edge from the side edge. Lines of weakness may additionally or alternatively be provided substantially parallel to the top and bottom edges and disposed on the opposite sides of the patterns adjacent the top and bottom edges from the top and bottom edges. The patterns adjacent the side edges may be substantially continuous strips of pressure activated cohesive having a width "d" and a length much greater than the width, and the patterns adjacent the top and bottom edges may be rectangular blocks of pressure activated cohesive having a length "d". Preferably the centerlines of the spaced first and second series of patterns are spaced from each other slightly more than the dimension "d".

According to another aspect of the present invention a method of constructing a business form having confidential information, utilizing first and second specialized sheets such as described above, is provided. The method comprises the steps of: (a) Moving the first and second specialized sheets with respect to each other parallel to the top and bottom edges at least the dimension "d" so that the pressure activated cohesive patterns on the second face of the first sheet are aligned with the pressure activated cohesive patterns on the first face of a second of the specialized sheets. (b) Providing confidential information between the first and second specialized sheets. And, (c) applying pressure to the sheets so as to seal the aligned pressure activated cohesive patterns of the first and second sheets together, to provide a sealed packet.

Step (b) may be practiced by imaging confidential information on at least one of the second face of the first specialized sheet and the first face of the second specialized sheet, or step (b) may be practiced alternatively (or additionally) by inserting a third sheet of paper having confidential information thereon between the first and second specialized sheets, the third sheet having dimensions, when inserted, allowing it to fit between the patterns of pressure activated cohesive on the second face of the first specialized sheet, and the first face of the second specialized sheet. The first and second sheets are typically initially provided in a stack in a feed bin with the first face of the first specialized sheet engaging the second face of the second specialized sheet, and step (a) is practiced automatically.

The method typically utilizes an imaging device and an output tray on the opposite side of the feed bin from the imaging device, and step (a) is practiced by the subsets of (a1) automatically feeding the second sheet through the imaging device, and then (a2) automatically feeding the first sheet through the imaging device, and (a3) shifting all or part of one of the feed bin and output tray at least the dimension "d" between the effective practice of substeps (a1) and (a2). Substep (a3) may be practiced by shifting the feed bin (e.g. utilizing a solenoid, pneumatic cylinder, or the like), or by shifting an edge guide of the output tray. Step (b) may be practiced by imaging confidential information on at least one of the second face of the first specialized sheet and the first face of the second specialized sheet when practicing one or both of substeps (a1) and (a2).

The method may also comprise the further step (d), after step (c), of tearing the first and second specialized sheets along the lines of weakness thereof between the first and second patterns that are past the sealed packet portion of the sheets.

According to yet another aspect of the present invention an assembly for forming sealed packets from first and second specialized sheets as described above is provided. The assembly comprises the following components: A feed bin containing a stack of first and second specialized sheets, with the first face of the first specialized sheet engaging the second face of the second specialized sheet. An output tray for receiving first and second specialized sheets from the feed bin. An imaging device disposed between the feed bin and the output tray in a feed direction for imaging indicia on at least one of the first and second specialized sheets. And, means for shifting all or part of one of the feed bin and output tray substantially perpendicular to the feed direction at least the dimension "d" so as to align the pressure activated cohesive patterns on the second face of the first sheet with the pressure activated cohesive patterns on the first face of the second sheet.

The shifting means may comprise any suitable conventional structure such as a solenoid, pneumatic or hydraulic cylinder, a rotatable shaft having screw threads which are received by a traveling nut, a rotary actuator connected via a lever to the component shifted, etc. The shifting means may comprise an edge guide of the output tray and a means for shifting the edge guide in which case a light pressure nip wheel may be provided overlying sheets on the output tray, and rotatable about both a substantially vertical axis, and a substantially horizontal axis generally parallel to the top and bottom edges of the specialized sheets. Alternatively the shifting means may comprise means for shifting the feed bin. The imaging device typically comprises a non-impact (e.g. laser) printer or a facsimile machine.

The assembly according to the invention also typically comprises a sealer for applying sufficient pressure to the first and second sheets to seal the aligned pressure activated cohesive patterns thereof. The assembly may also comprise an inserter between the output tray and the sealer for inserting a third sheet having confidential indicia thereon between the first and second sheets, the third sheet having dimensions, when inserted, allowing it to fit between the patterns of pressure activated cohesive on the second face of the first specialized sheet, and the first face of the second specialized sheet.

It is the primary object of the present invention to provide for the advantageous, trouble-free, construction of form sets or sealed packets from specialized sheets having pressure activated cohesive. This and other objects of the invention will become clear from an inspection of the detailed description of the invention, and from the appended claims.

DETAILED DESCRIPTION OF THE DRAWINGS

Figure 1:
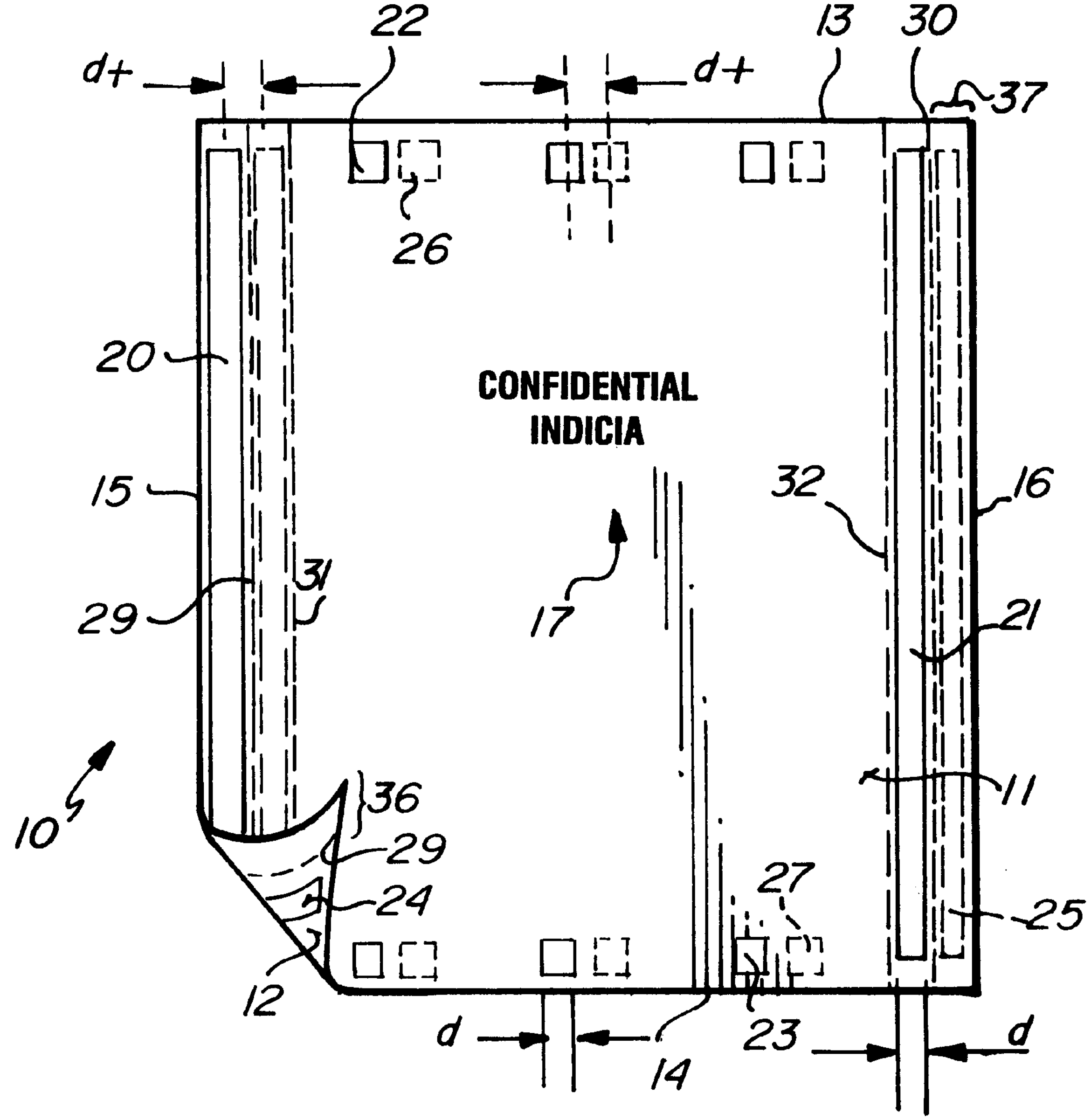
FIG. 1 is a top plan view of an exemplary specialized sheet according to the invention, with the bottom left corner thereof turned back to illustrate a portion of the opposite side of the sheet.

An exemplary specialized sheet, for making a form set or sealed packet, according to the present invention is shown generally by reference numeral 10 in FIG. 1. A modified form of the specialized sheet of FIG. 1 is shown by reference numeral 10' in FIGS. 2A and 2B.

The sheet 10 is a substantially quadrate sheet of paper having a first face 11 and a second face 12, top and bottom edges 13, 14, respectively, that are substantially parallel to each other, and first and second side edges 15, 16, respectively, which are substantially parallel to each other and substantially perpendicular to the top and bottom edges 13, 14. Confidential indicia 17 may be printed on one of the faces 11, 12, depending upon how the sheet 10 will be oriented with respect to another sheet with which it cooperates, and non-confidential information or indicia may also be printed on one or both of the faces 11, 12. Exemplary non-confidential indicia is illustrated schematically at 18 in FIG. 2B with respect to the sheet 10'.

The sheet 10 also includes a first series of patterns of pressure activated cohesive disposed on the first face 11, including the patterns 20, 21 adjacent the first and second side edges 15, 16, respectively. The patterns 20, 21 are illustrated as continuous strips of cohesive, but may have other configurations or geometries. The first series also preferably includes the cohesive patterns 22, 23 which are adjacent the top and bottom edges 13, 14, respectively.

The pressure activated cohesive according to the present invention is conventional per se. Preferably it comprises a styrene-natural rubber copolymer, as disclosed in U.S. Pat. No. 4,918,128. The pressure sensitive cohesive, in various trade available forms thereof, and patents showing the same, are disclosed in U.S. Pat. No. 5,201,464 (the disclosure of which is hereby incorporated by reference herein), and updated commercial versions may also be utilized, such as TN-124F, available from TOPPAN Printing Company of Japan.

The patterns 20–23 have a dimension "d" parallel to the top and bottom edges 13, 14. Regardless of exact form of the patterns 20–23 the dimension "d" should be provided, although some of the patterns may have slightly less or slightly greater dimensions, depending on the particular ultimate use of the sheet 10 and the particular cohesive utilized.

The sheet 10 also comprises a second series of patterns of pressure activated cohesive disposed on the second face 12 which are substantially identical to the first series of patterns 20–23 . The second series of patterns are illustrated in dotted line in FIG. 1, except that a portion of the pattern 24 is visible on the upturned lower left edge of the form 10 of FIG. 1. Patterns 24 and 25 are adjacent the edges 15, 16, and patterns 26 and 27 are adjacent the edges 13, 14. The centerlines of the patterns 20, 24, and separately 21, 25, and separately 22, 26, and separately 23, 27 are spaced from each other at least the substantially uniform dimension "d" parallel to the top and bottom edges 12, 13, as indicated by the designation "d+" in FIG. 1. This spacing could be exactly “d”, but in preferred practice typically is slightly more (only one or a few millimeters) than the dimension “d”.

Lines of weakness, such as perforation lines, may also be associated with the sheet 10. For example lines of weakness such as perforation lines 29, 30 are disposed in the sheet 10 substantially parallel to the side edges 15, 16 and between the first and second series of patterns adjacent each side edge. That is the perforation line 29 is between and parallel to the patterns 20, 24 and the perforation line 30 is between and parallel to the patterns 21, 25. Other perforation lines 31, 32 also may be provided, the perforation line 31 on the opposite side of the pattern 24 from the pattern 20, and the perforation line 32 on the opposite side of the pattern 21 from the pattern 25. These perforation lines 29–32 allow the final sealed packet to have approximately the same dimensions as the sheet 10, and/or allow ready opening of the sealed packet or form set.

In the FIG. 1 embodiment, the side strips of the sheet 10 outside of the perforation lines 29, 30 are indicated by reference numerals 36, 37, the strips 36, 37 being removable along those lines.

Figure 2A:
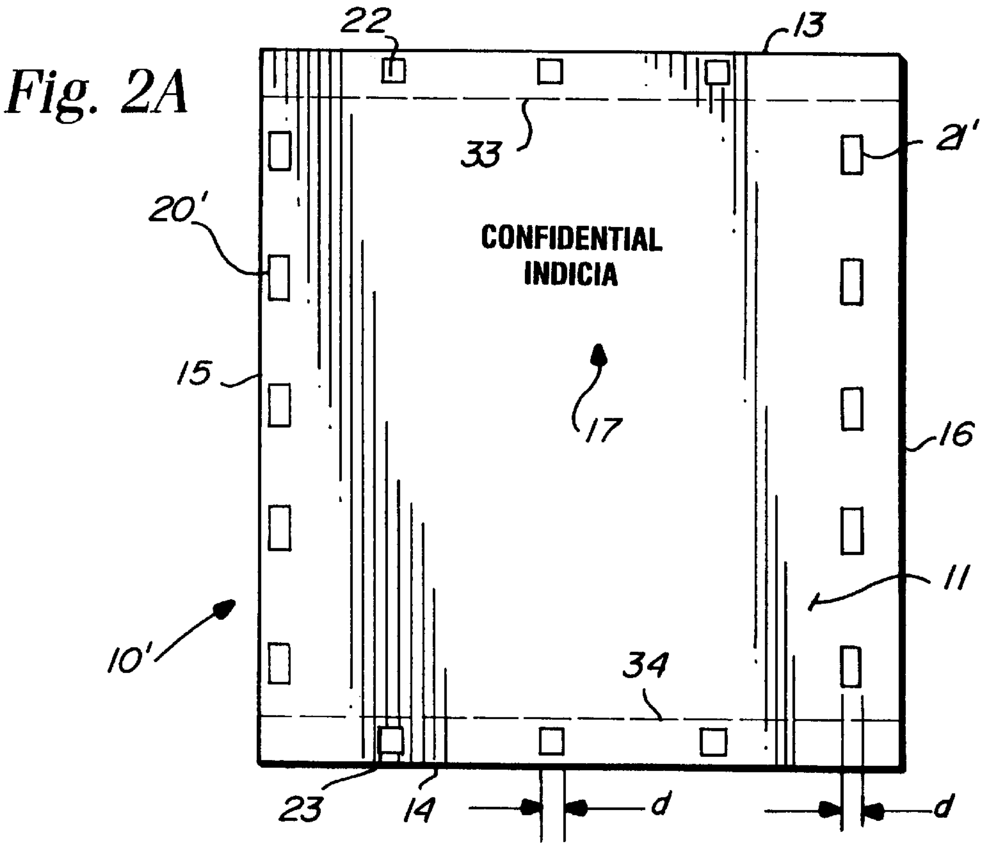
FIGS. 2A and 2B are top plan views of the first and second faces of a second embodiment of an exemplary specialized sheet according to the invention.
Figure 2B:
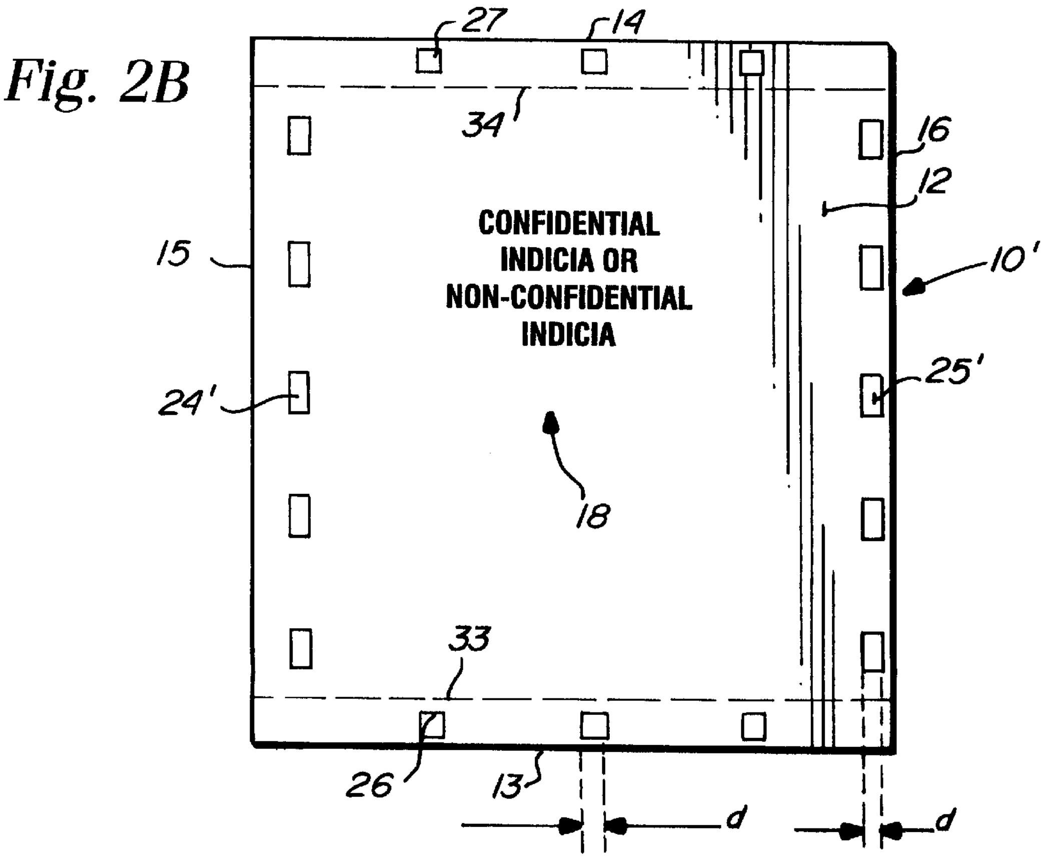

FIGS. 2A and 2B show a sheet 10' which is substantially identical to the sheet 10 except for the particular configuration of the cohesive patterns adjacent the side edges 15, 16 and the location of the perforation lines. In FIGS. 2A and 2B components identical to those in FIG. 1 are shown by the same reference numeral, and those that are similar but not identical are shown by the same reference numeral only followed by a “'”.

In the FIGS. 2A and 2B embodiment, the patterns 20', 21', 24', and 25' are spaced blocks, or a discontinuous strip, of pressure activated cohesive rather than being a continuous strip as illustrated in FIG. 1. Again other geometries aside from substantially rectangular blocks, or discontinuous strips, may be provided. When one sheet 10' is disposed atop another and shifted a distance d, or d+, the patterns 24', 25' are aligned with the patterns 20', 21'.

Also in FIGS. 2A and 2B, lines of weakness 33, 34 are provided which are parallel to the edges 13, 14, the line of weakness (such as a perforation line) 33 disposed adjacent the edge 13, on the opposite side thereof from the patterns 22, 26, while the perforation line 34 is adjacent the edge 14 and on the opposite side of the patterns 23, 27 from the edge 14. The perforation lines 33, 34 are to facilitate opening of a sealed packet formed by two of the sheets 10'.

Figure 3:
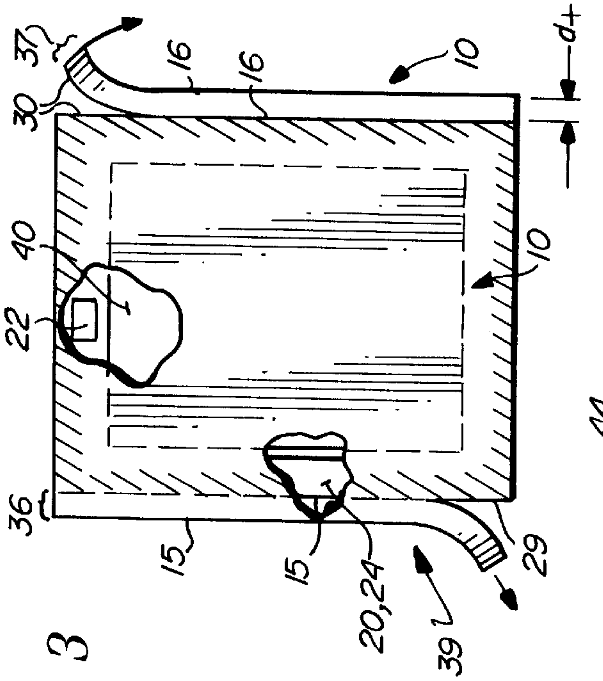
FIG. 3 is a top plan view of a sealed packet or form set constructed utilizing two of the specialized sheets of either FIG. 1 or FIGS. 2A and 2B, with portions of the overlying sheet cut away for clarity of illustration, and showing detachment of the edge portions thereof along perforation lines.

FIG. 3 illustrates an exemplary sealed packet or form set, generally by reference numeral 39, that may be formed utilizing two of the sheets 10 (or two of the sheets 10'). Portions of the top sheet 10 of the packet 39 are cut away for clarity of illustration of the bottom sheet 10 and the various components associated therewith. The packet 39 is formed by shifting the top sheet 10 with respect to the bottom sheet 10 to the left (as viewed in FIG. 3) a dimension substantially equal to “d+” so that the patterns 20, 24 align, as well as separately the patterns 21, 25; 22, 26; and 23, 27; from one sheet 10 to the other sheet 10. That is the edges 15 from the two sheets, and the edges 16 of the two sheets, 10, are spaced from each other substantially the dimension “d+”.

As seen in FIG. 3, the edge strip 36 of the top sheet 10 may be removed by tearing along the perforation line 29 of the top sheet 10, while strip 37 of the bottom sheet 10 is removed by tearing along the perforation line 30 of the bottom sheet. By doing this, the final packet 39 formed has substantially the same width and length as the sheet 10 illustrated in FIG. 1 (e.g. 8½x11 inches, A4 size, 8½x14 inches, 9 x13, etc.).

FIG. 3 also illustrates an insert shown schematically at 40, between the top and bottom sheets 10. The insert 40 is a third paper sheet either having natural dimensions that are such that when the sheet 40 is inserted between the sheets 10 it fits between the pattern of cohesive 20–27 on the second face 12 of one of the sheets 10, and the first face 11 of the second of the sheets 10; or when folded the third sheet 40 has the appropriate dimensions to fit within the cohesive patterns 20–27. Insert 40 may be inserted as shown in co-pending application Ser. No. 08/749,697.

Figure 4:
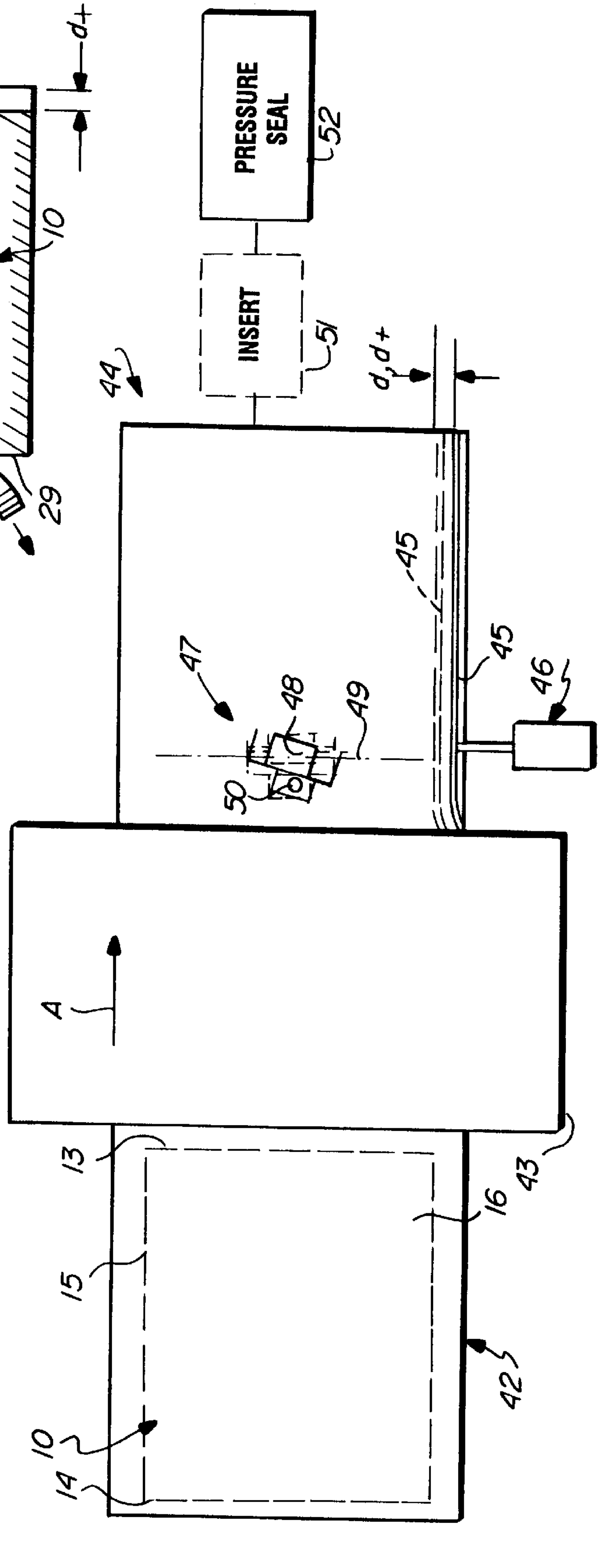
FIG. 4 is a top plan schematic view of one embodiment of an exemplary assembly according to the present invention for forming a sealed packet like that of FIG. 3.
Figure 5:
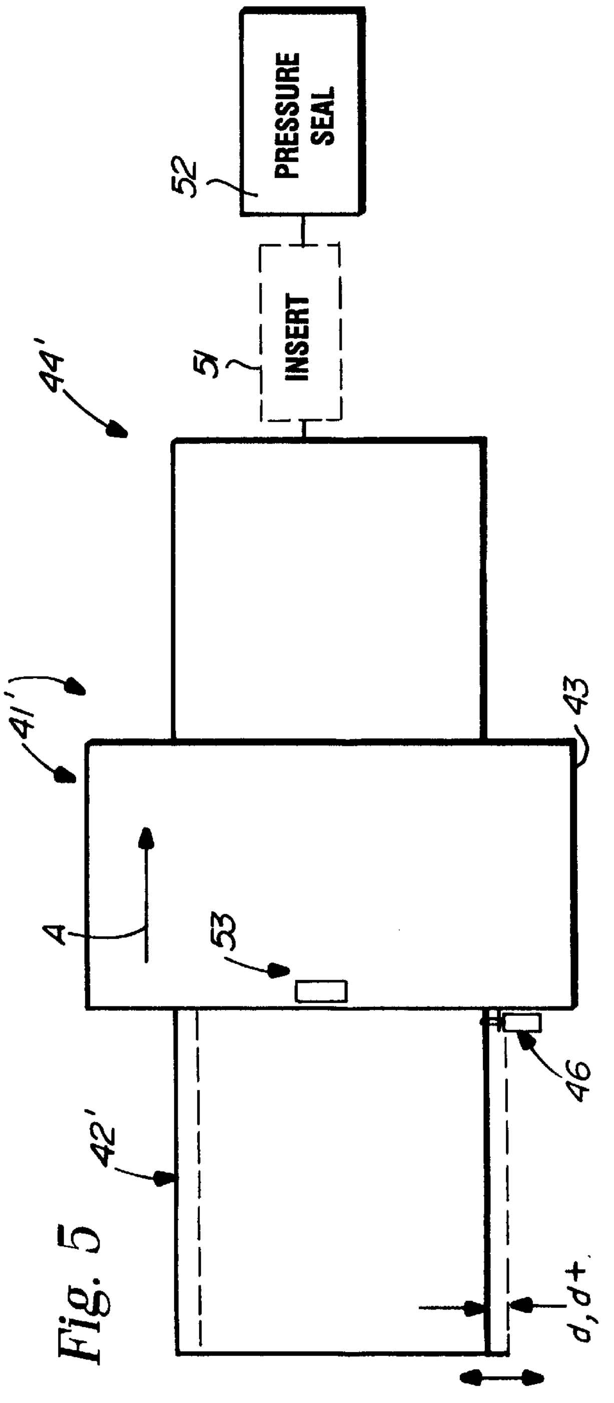
FIG. 5 is a view like that of FIG. 4 for a second embodiment of an assembly according to the invention.

FIGS. 4 and 5 show two exemplary embodiments for an assembly for forming sealed packets 39 from first and second specialized sheets 10, 10', according to the present invention. The assembly shown generally by reference numeral 41 in FIG. 4 includes a feed bin 42 containing a stack of the specialized sheets 10 with the first face 11 of one specialized sheet engaging the second face 12 of the next specialized sheet. The assembly 41 further comprises an imaging device 43, such as a printer (e.g. a non-impact printer, such as a laser printer), fax machine, or like device that is capable of placing an image on a piece of paper, such as placing the indicia 17, 18 on the sheets 10 (or 10'). The assembly 41 further comprises an output tray 44 which is on the opposite side of the imaging device 43 from the feed bin 42 in the direction of feed A. In the feed bin 42 each of the sheets 10 has an orientation so that the edges 13, 14 are perpendicular to the feed direction A, and the side edges 15, 16 are substantially parallel to the direction A. The sheets 10 are fed one at a time through the imaging device 43 utilizing conventional drive components (such as a conveyor associated with the feed bin 42 and/or conventional drive rollers or other drive components in the imaging device 43) to the output tray 44.

The assembly 41 also comprises means for shifting all or part of one of the feed bin 42 and output tray 44 substantially perpendicular to the feed direction A (that is parallel to the edges 13, 14 of the sheets 10) at least the dimension d (typically almost exactly the dimension d+) so that the pressure cohesive patterns 20–27 are aligned for two sheets 10 disposed one atop the other in the output tray 44. In the preferred embodiment illustrated in FIG. 4, the shifting means includes the output tray edge guide 45, which is shiftable between the solid and dotted line positions illustrated in FIG. 4, those positions being spaced the dimension d (or d+), perpendicular to the feed direction A, by the actuator 46. The actuator 46 is itself a means for shifting, which moves the edge guide 45. The actuator 46 may be a solenoid, a pneumatic or hydraulic cylinder, an electric motor rotating a screw threaded shaft received by a traveling nut, a rotatable or pivotal element connected by a lever to the edge guide 45, or any like suitable conventional structure.

Associated with the output tray 44, for moving the sheets 10 into proper position so that the various pressure activated cohesive patterns 20–27 thereof are aligned is a light pressure nip wheel assembly 47. The assembly 47 includes the wheel 48 which is rotatable about a horizontal axis 49 which is generally (although not exactly, because of movement about a second axis) parallel to the edges 13, 14, and is also pivotal about a generally vertical axis 50 so that shifting of the sheets 10 the dimension d (or d+) is accommodated. The light pressure may be provided merely by the weight of the assembly 47, or by a light spring pressure.

The nip wheel assembly 47 is intended to move the paper 10 into the output tray 44 either straight, or toward the edge guide 45. By pivoting the nip wheel assembly 47 so the horizontal axis is parallel to the top and bottom edges of the form 10, the nip wheel 48 pushes the paper 10 straight forward (the edge guide would be moved to the innermost position accordingly). By pivoting the nip wheel assembly 47 slightly to direct the paper toward the edge guide 45, and simultaneously moving the edge guide 45 out the distance "d+", the paper is pushed over by the nip wheel 48 until its side edge contacts the edge guide 45 and the sheet is thereby shifted the distance "d+".

Figure 6:
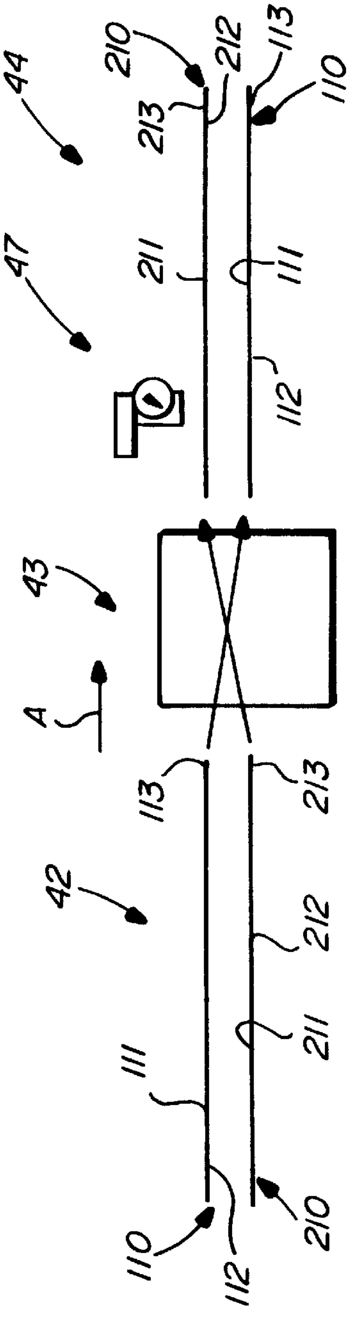
FIG. 6 is a schematic side view showing the transposition of sheets from the feed bin to the output tray and utilizing the assembly of FIG. 4.

FIG. 6 illustrates, schematically, the reorientation of sheets from the feed bin 42 to the output tray 44 in the manufacture of the form set or packet 39. Two identical sheets, comparable to the sheet 10 are illustrated by reference numerals 110, 210 in FIG. 6, with the sheet 110 having a first face 111 and a second face 112 and the sheet 210 having a first face 211 and a second face 212.

As seen in FIG. 6 the sheet 110 is on top of the sheet 210 in the feed bin 42, but after both sheets 110, 210 are fed one at a time in the direction A through the imaging device 43 the sheet 110 is now below the sheet 210. In the feed bin 42 the faces 211, 112 are in engagement with each other and on those faces the cohesive patterns are spaced from each other. After feeding to the output, the faces 111, 212 are in engagement with each other, and since one of the sheets 110, 210 has been shifted approximately the dimension "d+" in the direction perpendicular to the direction A (while the other is not so shifted) the pressure cohesive patterns (20–27) thereon are aligned with each other for subsequent sealing.

The assembly 41 also includes an optional inserter 51, such as shown in co-pending application Ser. No. 08/749,697, for inserting the sheet 40, if desired, and the conventional pressure seal equipment 52, such as sold by Moore USA, Inc. of Lake Forest, Ill. under the trademark SPEEDISEALER®, and such as shown in U.S. Pat. Nos. 5,397,427, 5,183,527, 5,169,489, 5,133,828, and 5,378,303. Other conventional equipment can also be used just so sufficient pressure (typically on the order of about 100 lbs. per lineal inch, or more) is applied to the sheets 110, 210 so that the cohesive patterns 20–27 thereof are pressed into permanent engagement with each other.

Once the packet 39 has been formed it is most easily opened by tearing along perforation lines, such as the lines 31, 32 if sheets 10 are used, or lines 33, 34 if sheets 10' are used (or any or all of those perforation lines if all of the perforation lines 31–34 are provided in the sheets).

FIG. 5 illustrates a modified form of the assembly of FIG. 4. The modified assembly is shown generally by reference numeral 41'. Components that are the same as those in the FIG. 4 embodiment are shown by the same reference numeral and those only slightly different shown by the same reference numeral with a "'".

The major difference between the FIG. 5 and FIG. 4 embodiments is that the assembly 41' has a feed bin 42' which is shiftable a dimension d, d+ in a horizontal direction substantially perpendicular to the feeding direction A. The shifting means comprises an actuator 46, and the entire feed bin 42' may be mounted on rollers, rails, or any other mechanism that allows such a short shift. In the FIG. 5 embodiment the output tray 44' need not have a shiftable edge guide as illustrated in the FIG. 4 embodiment. In the FIG. 5 embodiment an infeed nip wheel 53, which is basically stationarily mounted (rotatable only about a generally horizontal axis perpendicular to the feed direction A) is provided to assist in proper guiding of the sheets from one side of the imaging device 43 to the other (to assume the positions illustrated in FIG. 6).

In the practice of the present invention, a first of the sheets 10 is moved parallel to the top and bottom edges 13, 14 at least a dimension "d" so that the pressure activated cohesive patterns 20–27 on the second face of the first sheet are aligned with those on the first face of a non-shifted second sheet; confidential information is provided between the first and second specialized sheets, either by imaging (as indicated at 17) on the sheets 10 utilizing the imaging device 43, or by printing confidential information on the third sheet 40 which is inserted between the other sheets 10; and pressure is applied to the sheets 10, utilizing a pressure sealer 52, to seal the aligned pressure activated cohesive patterns 20–27 to provide the sealed packet 39. The moving step may be practiced by automatically feeding the second of the sheets 10 through the imaging device 43 and then automatically feeding the first sheet through the imaging device 43, as indicated for the sheets 110, 210 in FIG. 6, and shifting all or part of one of the feed bin 42, 42' and output tray 44, 44' (that is edge guide 45 coordinating with nip wheel assembly 47 of the output tray 44) at least the dimension "d" between the effective practice of the other feeding steps, so as to align the pressure activated cohesive patterns on the sheets 110, 210.

It will thus be seen that according to the present invention a specialized sheet, a method of constructing a business form having confidential information, and an assembly for forming sealed packets, have been provided which allow identical individual sheets to be utilized in a stack in a feed bin yet without blocking. While the invention has been herein shown and described in what is presently conceived to be the most practical and preferred embodiment thereof it will be apparent to those of ordinary skill in the art that many modifications may be made within the scope of the invention, for example both sheets forming a packet may be shifted so that the total shift is substantially the dimension "d+", i.e. so that the cohesive patterns are aligned. In any event, the scope of the invention is to be accorded the broadest interpretation of the appended claims so as to encompass all equivalent products, methods, and apparatus.

What is claimed is:

1. A method of constructing a business form having confidential information, utilizing first and second specialized sheets each comprising: a substantially quadrate sheet of paper having first and second faces, top and bottom edges substantially parallel to each other, and first and second side edges substantially parallel to each other and substantially perpendicular to the top and bottom edges; a first series of patterns of pressure activated cohesive disposed on the first face, including adjacent the first and second side edges and having a substantially uniform dimension "d" parallel to the top and bottom edges; and a second series of patterns of pressure activated cohesive disposed on the second face which are substantially identical to the first series of patterns, and having the centerline thereof spaced from the first series of patterns at least the substantially uniform dimension "d" parallel to the top and bottom edges; said method comprising the steps of:

(a) moving the first and second specialized sheets with respect to the second sheet parallel to the top and bottom edges at least the dimension "d" so that the pressure activated cohesive patterns on the second face of the first sheet are aligned with the pressure activated cohesive patterns on the first face of a second of the specialized sheets;

(b) providing confidential information between the first and second specialized sheets; and (c) applying pressure to the sheets so as to seal the aligned pressure activated cohesive patterns of the first and second sheets together, to provide a sealed packet.

2. A method as recited in claim 1 wherein step (b) is practiced by imaging confidential information on at least one of the second face of the first specialized sheet and the first face of the second specialized sheet.

3. A method as recited in claim 2 wherein the first and second specialized sheets are initially provided in a stack in a feed bin with the first face of the first specialized sheet engaging the second face of the second specialized sheet; and wherein step (a) is practiced automatically.

4. A method as recited in claim 2 wherein the specialized sheets further comprise lines of weakness disposed in each sheet substantially parallel to the side edges, including lines of weakness between the first and second series of patterns adjacent each side edge; and wherein said method comprises the further step (d), after step (c), of tearing the first and second specialized sheets along the lines of weakness thereof between the first and second patterns that are past the sealed packet portion of the sheets.

5. A method as recited in claim 2 wherein step (b) is practiced by inserting a third sheet of paper having confidential information thereon between the first and second specialized sheets, the third sheet having dimensions, when inserted, allowing it to fit between the patterns of pressure activated cohesive on the second face of the first specialized sheet, and the first face of the second specialized sheet.

6. A method as recited in claim 5 wherein the first and second specialized sheets are initially provided in a stack in a feed bin with the first face of the first specialized sheet engaging the second face of the second specialized sheet; and wherein step (a) is practiced automatically.

7. A method as recited in claim 6 wherein the specialized sheets further comprise lines of weakness disposed in each sheet substantially parallel to the side edges, including lines of weakness between the first and second series of patterns adjacent each side edge; and wherein said method comprises the further step (d), after step (c), of tearing the first and second specialized sheets along the lines of weakness thereof between the first and second patterns that are past the sealed packet portion of the sheets.

8. A method as recited in claim 1 wherein the first and second specialized sheets are initially provided in a stack in a feed bin with the first face of the first specialized sheet engaging the second face of the second specialized sheet; and wherein step (a) is practiced automatically.

9. A method as recited in claim 8 wherein the specialized sheets further comprise lines of weakness disposed in each sheet substantially parallel to the side edges, including lines of weakness between the first and second series of patterns adjacent each side edge; and wherein said method comprises the further step (d), after step (c), of tearing the first and second specialized sheets along the lines of weakness thereof between the first and second patterns that are past the sealed packet portion of the sheets.

10. A method as recited in claim 8 utilizing an imaging device, and an output tray on the opposite side of the feed bin from the imaging device; and wherein step (a) is practiced by the subsets of (a1) automatically feeding the second sheet through the imaging device, and then (a2) automatically feeding the first sheet through the imaging device, and (a3) shifting all or part of one of the feed bin and output tray at least the dimension "d" between the effective practice of substeps (a1) and (a2).

11. A method as recited in claim 10 wherein step (b) is practiced by inserting a third sheet of paper having confidential information thereon between the first and second specialized sheets, the third sheet having dimensions, when inserted, allowing it to fit between the patterns of pressure activated cohesive on the second face of the first specialized sheet, and the first face of the second specialized sheet.

12. A method as recited in claim 10 wherein step (b) is practiced by imaging confidential information on at least one of the second face of the first specialized sheet and the first face of the second specialized sheet when practicing one or both of substeps (a1) and (a2).

13. A method as recited in claim 10 wherein the specialized sheets further comprise lines of weakness disposed in each sheet substantially parallel to the side edges, including lines of weakness between the first and second series of patterns adjacent each side edge; and wherein said method comprises the further step (d), after step (c), of tearing the first and second specialized sheets along the lines of weakness thereof between the first and second patterns that are past the sealed packet portion of the sheets.

14. A method as recited in claim 10 wherein substep (a3) is practiced by shifting the feed bin.

15. A method as recited in claim 14 wherein the specialized sheets further comprise lines of weakness disposed in each sheet substantially parallel to the side edges, including lines of weakness between the first and second series of patterns adjacent each side edge; and wherein said method comprises the further step (d), after step (c), of tearing the first and second specialized sheets along the lines of weakness thereof between the first and second patterns that are past the sealed packet portion of the sheets.

16. A method as recited in claim 10 wherein substep (a3) is practiced by shifting an edge guide of the output tray.

17. A method as recited in claim 16 wherein the specialized sheets further comprise lines of weakness disposed in each sheet substantially parallel to the side edges, including lines of weakness between the first and second series of patterns adjacent each side edge; and wherein said method comprises the further step (d), after step (c), of tearing the first and second specialized sheets along the lines of weakness thereof between the first and second patterns that are past the sealed packet portion of the sheets.

18. A method as recited in claim 1 wherein step (b) is practiced by inserting a third sheet of paper having confidential information thereon between the first and second specialized sheets, the third sheet having dimensions, when inserted, allowing it to fit between the patterns of pressure activated cohesive on the second face of the first specialized sheet, and the first face of the second specialized sheet.

19. A method as recited in claim 18 wherein the first and second specialized sheets are initially provided in a stack in a feed bin with the first face of the first specialized sheet engaging the second face of the second specialized sheet; and wherein step (a) is practiced automatically.

20. A method as recited in claim 18 wherein the specialized sheets further comprise lines of weakness disposed in each sheet substantially parallel to the side edges, including lines of weakness between the first and second series of patterns adjacent each side edge; and wherein said method comprises the further step (d), after step (c), of tearing the first and second specialized sheets along the lines of weakness thereof between the first and second patterns that are past the sealed packet portion of the sheets.

21. A method as recited in claim 1 wherein the specialized sheets further comprise lines of weakness disposed in each sheet substantially parallel to the side edges, including lines of weakness between the first and second series of patterns adjacent each side edge; and wherein said method comprises the further step (d), after step (c), of tearing the first and second specialized sheets along the lines of weakness thereof between the first and second patterns that are past the sealed packet portion of the sheets.

* * * * *